Patented Apr. 19, 1949

2,467,583

UNITED STATES PATENT OFFICE 2,467,583

PENICILLIN SOLUTIONS

Charles Cosar, Paris, France, assignor to Societe des Usines Chimiques Rhone-Poulenc, Paris, France, a French company No Drawing. Application April 5, 1946, Serial No. 659,888. In France April 17, 1945

2 Claims. (Cl. 167—65)

This invention is for improvements in or relating to penicillin; more specifically it concerns means for improving the properties of penicillin solutions administered by injection.

For therapeutic application by parenteral administration, penicillin is used in the form of its aqueous solution. Now it is known that one of the practical disadvantages of this drug is the fact that its rapid elimination from, and destruction in, the body necessitates an excessive repetition of injections, a factor which obviously causes great discomfort to the patient and, furthermore, adds to the work of those administering the drug. Nevertheless, this is at present necessary for the full exploitation of the curative properties of the drug, which, being costly, demands the most economical and rational application possible.

According to the present invention, it has now been discovered that it is possible to prepare solutions of penicillin which are considerably more slowly eliminated from the body than the aqueous solutions heretofore known, by replacing the water or physiological serum generally used in preparing solutions for injection by an aqueous solution (at a concentration, for example, of 10 to 30%) of polyvinyl pyrrolidone polymer which may have a molecular weight of the order of 30,000 to 40,000. If desired, small quantities of metal salts may be used as adjuncts to this solution.

It is possible to demonstrate experimentally that, with equal dosages of penicillin, the in vivo antibacterial action of the solutions of the present invention is very much greater than that of a solution in water or physiological serum. By way of example, there are now given the results of in vivo tests on mice.

Thirty mice were divided into three groups of ten. Each mouse was given an intraperitoneal injection of a diluted pneumococcus culture (culture of pneumococcus, Till strain, 24 hours old, diluted immediately before use to 1/100,000 with Tyrode solution). Into each mouse, 0.5 cc. of this dilute suspension was injected. The first group of ten mice received a subcutaneous injection of 200 units of penicillin per 20 g. bodyweight immediately after inoculation with the infecting organism. Two further such injections were given after periods of 18 and 24 hours respectively. For this first group of mice, the penicillin was used as a solution of 400 units per cc. in physiological serum. The second group of ten mice was similarly treated with, however, the difference that in place of physiological serum, a 20% solution of polyvinyl pyrrolidone was used. Finally, for the third group of mice, which served as controls, no curative treatment was given. Observation of the three groups showed that all the controls were dead by the second day of the trial. In the case of mice treated with penicillin in physiological serum solution, the mortality was 60% on the third day, rising to 100% on the fourth day. By contrast, for the mice treated with penicillin in polyvinyl pyrrolidone, mortality had risen to only 10% on the tenth day.

Study of the elimination of penicillin in the urine of a mouse which had been given a subcutaneous injection of 200 units of penicillin showed that, where the drug is dissolved in physiological serum, elimination is very rapid, whereas the case of the solution in polyvinyl pyrrolidone, elimination is markedly retarded.

It therefore follows that by using penicillin solutions prepared with polyvinyl pyrrolidone as hereinbefore described, a given dose of penicillin will produce, in vivo, an antibacterial effect which is clearly superior to that obtained with solutions in either water or physiological serum. This affords an economy in the use of the active drug and further, by using this novel solution, the intervals between injections may be appreciably lengthened, to the greater comfort of the patient.

As will be understood in the art, the term "penicillin" is, in this specification and the appended claims, used in its generic sense to connote any water-soluble or water-dispersible form of the drug and includes, for example, the sodium and other alkali metal salts of the parent acid.

Polyvinylpyrrolidone suitable for use in the present invention may be prepared by the general process set forth in German Patent No. 737,663.

In the method therein described N-vinylpyrrolidone is prepared by the action of acetylene on pyrrolidone under high pressure in the presence of a strongly alkaline material such as a hydroxide or alcoholate of an alkali metal or alkaline earth metal as catalyst and is then treated, for example by refluxing, with an aqueous solution of a water-soluble neutral sulphite.

I claim:

1. An aqueous penicillin solution prepared for use by injection which contains at least 10% by weight of polyvinyl pyrrolidone having a molecular weight lying between 30,000 and 40,000.

2. An aqueous penicillin solution prepared for use by injection which contains between 10% and 30% by weight of polyvinyl pyrrolidone having a molecular weight lying between 30,000 or 40,000.

CHARLES COSAR.

REFERENCES CITED

The following references are of record in the file of this patent:

UNITED STATES PATENTS

| Number | Name | Date |
|---|---|---|
| 2,155,658 | Herrmann et al. | Apr. 25, 1939 |

FOREIGN PATENTS

| Number | Country | Date |
|---|---|---|
| 738,994 | Germany | Aug. 5, 1943 |

OTHER REFERENCES

Chemical Abstracts, Nov. 20, 1945, column 5408.

Science, Sept. 1, 1944, pages 196 to 198.

Cosar, Comptes Rendus de la Soc. de Biologie (1945), pages 388–391.